US010169234B2

(12) United States Patent
Friedmann et al.

(10) Patent No.: US 10,169,234 B2
(45) Date of Patent: *Jan. 1, 2019

(54) TRANSLATION LOOKASIDE BUFFER PURGING WITH CONCURRENT CACHE UPDATES

(71) Applicant: International Business Machines Corporation, Armonk, NY (US)

(72) Inventors: Simon H. Friedmann, Boeblingen (DE); Markus Kaltenbach, Holzgerlingen (DE); Dietmar Schmunkamp, Schoenaich (DE); Johannes C. Reichart, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/790,387

(22) Filed: Oct. 23, 2017

(65) Prior Publication Data

US 2018/0349278 A1    Dec. 6, 2018

Related U.S. Application Data

(63) Continuation of application No. 15/613,530, filed on Jun. 5, 2017.

(51) Int. Cl.
*G06F 12/0811*    (2016.01)
*G06F 12/1045*    (2016.01)

(52) U.S. Cl.
CPC ...... *G06F 12/0811* (2013.01); *G06F 12/1063* (2013.01); *G06F 2212/68* (2013.01)

(58) Field of Classification Search
None
See application file for complete search history.

(56) References Cited

U.S. PATENT DOCUMENTS

| 5,765,193 | A | * | 6/1998 | Rosich | G06F 12/0804 |
| | | | | | 711/136 |
| 5,787,494 | A | * | 7/1998 | DeLano | G06F 12/1027 |
| | | | | | 711/206 |

(Continued)

OTHER PUBLICATIONS

Rosenburg, Bryan S., "Low-Synchronization Translation Lookaside Buffer Consistency in Large-Scale Shared-Memory Multiprocessors", © 1989 ACM 089791-338-3/89/0012/0137, 10 pages.

(Continued)

*Primary Examiner* — Brian R Peugh
*Assistant Examiner* — Alex G Olson
(74) *Attorney, Agent, or Firm* — Edward J. Wixted, III (57) ABSTRACT

A method and computer processor performs a translation lookaside buffer (TLB) purge with concurrent cache updates. Each cache line contains a virtual address field and a data field. A TLB purge process performs operations for invalidating data in the primary cache memory which do not conform to the current state of the translation lookaside buffer. Whenever the TLB purge process and a cache update process perform a write operation to the primary cache memory concurrently, the write operation by the TLB purge process has no effect on the content of the primary cache memory and the cache update process overwrites a data field in a cache line of the primary cache memory but does not overwrite a virtual address field of said cache line. The translation lookaside buffer purge process is subsequently restored to an earlier state and restarted from the earlier state.

10 Claims, 7 Drawing Sheets

(56) References Cited

U.S. PATENT DOCUMENTS

| | | | | |
|---|---|---|---|---|
| 6,161,208 | A * | 12/2000 | Dutton | G06F 11/1008 711/118 |
| 6,263,403 | B1 | 7/2001 | Traynor | |
| 6,684,315 | B2 | 1/2004 | James et al. | |
| 7,117,338 | B2 * | 10/2006 | Brewer | G06F 11/0724 711/207 |
| 7,552,255 | B1 * | 6/2009 | George | G06F 12/1036 710/58 |
| 7,631,147 | B2 | 12/2009 | Ganguly | |
| 8,266,383 | B1 * | 9/2012 | Minkin | G06F 12/0859 710/39 |
| 8,751,752 | B2 | 6/2014 | Cota-Robles et al. | |
| 9,009,355 | B1 * | 4/2015 | Jan | G06F 12/0804 710/1 |
| 9,384,133 | B2 * | 7/2016 | Gschwind | G06F 12/0833 |
| 9,454,490 | B2 | 9/2016 | Slegel et al. | |
| 9,928,180 | B2 * | 3/2018 | Malyugin | G06F 12/1027 |
| 2004/0059872 | A1 | 3/2004 | Genduso | G06F 12/0808 711/135 |
| 2009/0300288 | A1 * | 12/2009 | Lefebvre | G06F 12/0804 711/128 |
| 2009/0327575 | A1 * | 12/2009 | Durham | G06F 12/145 711/6 |
| 2010/0011188 | A1 * | 1/2010 | Eddy | G06F 9/383 711/207 |
| 2010/0250869 | A1 * | 9/2010 | Adams | G06F 12/1063 711/154 |
| 2011/0238947 | A1 * | 9/2011 | Nishiguchi | G06F 12/1036 711/207 |
| 2013/0191684 | A1 * | 7/2013 | Busaba | G06F 11/1497 714/10 |
| 2014/0019803 | A1 * | 1/2014 | Busaba | G06F 11/1438 714/16 |
| 2014/0129789 | A1 * | 5/2014 | Deutschle | G06F 12/16 711/162 |
| 2014/0129798 | A1 * | 5/2014 | Deutschle | G06F 12/1027 711/207 |
| 2014/0143497 | A1 * | 5/2014 | Olson | G06F 12/0802 711/132 |
| 2014/0281363 | A1 * | 9/2014 | Tian | G06F 12/10 711/207 |
| 2014/0331012 | A1 * | 11/2014 | Wang | G06F 12/0855 711/140 |
| 2014/0331224 | A1 * | 11/2014 | Robenko | G06F 9/45533 718/1 |
| 2016/0140051 | A1 | 5/2016 | Kessler et al. | |
| 2016/0357683 | A1 * | 12/2016 | Takeda | G06F 12/1009 |
| 2016/0378652 | A1 * | 12/2016 | Takeda | G06F 12/0897 711/122 |

OTHER PUBLICATIONS

Thompson et al., "Translation Lookaside Buffer Synchronization in a Multi-Processor System", Silicon Graphics, Incorporated, printed on May 12, 2017, 10 pages.

"Translation Lookaside Buffer Flush Optimization", HagenPaulPfeifer, Aug. 6, 2010, 1 page.

Friedmann et al., "Translation Lookaside Buffer Purging With Concurrent Cache Updates", U.S. Appl. No. 15/613,530, filed Jun. 5, 2017, 43 pages.

IBM Appendix P, list of patents and patent applications treated as related, filed herewith, 2 pages.

* cited by examiner

TRANSLATION LOOKASIDE BUFFER PURGING WITH CONCURRENT CACHE UPDATES

BACKGROUND OF THE INVENTION

Modern computer processors typically provide support for virtual memory. In a computer processor which utilizes virtual memory, a virtual address is a memory address which does not point to a physical memory address. Instead, the virtual address first needs to be translated into a physical memory address before data on a physical device can be accessed. Virtual memory facilitates application programming because it hides fragmented physical memory addresses from computer applications. Memory management usually employs a page table which serves to translate virtual addresses into physical addresses. Because access to the page table is comparatively slow, virtual addresses which have been recently accessed are stored in a translation lookaside buffer. A translation lookaside buffer is a type of cache memory which allows for quick data retrieval. When data is to be read from or written to a virtual memory address, a computer processor may initially access its translation lookaside buffer. The translation lookaside buffer returns a physical address which corresponds to the virtual address. Data which is stored at the physical address may then be accessed.

Modern computer processors typically feature at least one cache memory other than a translation lookaside buffer. Such a cache memory does not store virtual memory addresses, but instead mirrors data which is stored in a main memory of a computer system. Because access to the main memory is comparatively slower than access to the cache memory, it is preferable if data can be retrieved from the cache memory. Computer processors typically feature a cache hierarchy with multiple cache memories. In order to allow quick access to its cache memory without the need to translate a virtual memory address into a physical memory address, the data in some cache memories may be tagged by means of virtual addresses instead of physical addresses.

During normal system operation, the data contained within the translation lookaside buffer may become outdated, for instance because of a context switch of a user application. The information for address translation which is stored in the translation lookaside buffer may therefore become invalid. This also means that address information which is currently stored in any cache memory that employs virtual addresses in order to identify data may now also be invalid. Therefore, any such entries in the cache memory may now have to be invalidated. The process of invalidation of a cache memory is called a translation lookaside buffer purge. It invalidates entries in the cache memory which contain outdated and therefore incorrect virtual addresses.

However, when a translation lookaside buffer purge is started, there may still remain data which is queued to be written into the cache memory. For instance, this may be data which is currently being requested from another data cache within the cache hierarchy. For instance, supposing that a processor has a level one cache, a level two cache and a level three cache, when data is requested from the level three cache and there is a cache hit in the level three cache, then the data which has been successfully retrieved from the level three cache may also be stored into the level one cache and into the level two cache by an update process. This ensures that the level one cache and the level two cache always contain data which has been read recently from the level three cache. However, when a translation lookaside buffer purge is active concurrently to said update process, then update operations which are performed by the update process may conflict with operations for performing the translation lookaside buffer purge. For instance, virtual addresses which have been successfully invalidated by the translation lookaside buffer purge may be overwritten by the update process afterwards. As a result, the level one cache may contain invalid virtual address information after the translation lookaside buffer purge has been completed. Additionally, cache memories usually do not allow simultaneous write access by multiple processes.

A common way to avoid the aforementioned problems is to wait for all requests to the level three cache and the corresponding update operations to complete before the translation lookaside buffer purge process is started. However, this usually causes a high delay because accessing the level three cache memory has a comparatively high access latency. Typically, the access latency of any request to the level three cache is higher than the amount of time required to perform the complete translation lookaside buffer purge. Therefore, waiting for all update operations to complete has the disadvantage that it requires a long amount of time. Alternatively, the purge operation may be started immediately, discarding all pending requests to the level three cache. However, in this case, responses from the level three cache are lost and the same requests have to be issued again at a later time. This causes a delay after the purge operation. Additionally, in a multicore processor, multiple cores which run different threads may make use of the same cache hierarchy. In many cases, only the virtual addresses which correspond to one thread running on one processor core of a computer processor have to be updated. Therefore, only these addresses are subject to a translation lookaside buffer purge. The method as previously described has the disadvantage that threads running on different cores are effectively blocked if their requests to the level three cache are discarded.

SUMMARY

The present invention relates to a method for performing a translation lookaside buffer purge with concurrent cache updates in a computer system with a translation lookaside buffer and a primary cache memory having multiple cache lines. Each cache line contains a virtual address field and a data field. The method includes a translation lookaside buffer purge process. The translation lookaside buffer purge process performs operations for invalidating data in the primary cache memory which do not conform to the current state of the translation lookaside buffer. The method also includes a cache update process. Whenever the translation lookaside buffer purge process and the cache update process each perform a write operation to the primary cache memory simultaneously, the write operation by the translation lookaside buffer purge process has no effect on the content of the primary cache memory and the cache update process overwrites a data field in a cache line of the primary cache memory but does not overwrite a virtual address field of said cache line. The translation lookaside buffer purge process is subsequently restored to an earlier state and restarted from said earlier state.

The present invention also relates to a computer processor with a translation lookaside buffer and a primary cache memory with multiple cache lines. Each cache line contains a virtual address field and a data field, and the computer processor contains a purge unit which is configured to perform a translation lookaside buffer purge process. The purge unit is configured to perform operations for invalidating data in the primary cache memory which do not conform to the current state of the translation lookaside buffer. Additionally, the computer processor contains an update unit for performing a cache update process. The computer processor is configured such that, whenever the translation lookaside buffer purge process and the cache update process each perform a write operation to the primary cache memory simultaneously, the write operation by the translation lookaside buffer purge process has no effect on the content of the primary cache memory. An arbitration unit in the computer processor is configured such that, whenever the translation lookaside buffer purge process and the cache update process each perform a write operation to the primary cache memory simultaneously, it is ensured that the cache update process overwrites a data field in a cache line of the primary cache memory but does not overwrite a virtual address field of said cache line. The purge unit is configured to restore the translation lookaside buffer purge process to an earlier state and to restart the translation lookaside buffer purge process if the translation lookaside buffer purge process and the cache update process each perform a write operation to the primary cache memory simultaneously.

DETAILED DESCRIPTION

The present invention relates to a method for performing a translation lookaside buffer purge with concurrent cache updates in a computer system with a translation lookaside buffer and a primary cache memory having multiple cache lines. Each cache line contains a virtual address field and a data field. The method includes a translation lookaside buffer purge process. The translation lookaside buffer purge process performs operations for invalidating data in the primary cache memory which do not conform to the current state of the translation lookaside buffer. The method also includes a cache update process. Whenever the translation lookaside buffer purge process and the cache update process each perform a write operation to the primary cache memory simultaneously, the write operation by the translation lookaside buffer purge process has no effect on the content of the primary cache memory and the cache update process overwrites a data field in a cache line of the primary cache memory but does not overwrite a virtual address field of said cache line. The translation lookaside buffer purge process is subsequently restored to an earlier state and restarted from said earlier state.

An advantage of this method is that the translation lookaside buffer purge process and the cache update process may run concurrently. It is therefore not necessary to wait for the cache update process to complete before the translation lookaside buffer purge process is started. Whenever a cache update operation of the cache update process writes data to a cache line of the primary cache memory, it is ensured that the virtual address field of the primary cache memory is not overwritten. Therefore, if the cache update operation performs a write operation to a cache line which has previously been invalidated by the translation lookaside buffer purge process, the invalidated virtual address field will not be overwritten by a virtual address which is potentially invalid. However, data will be written to the data field of the cache line even if the translation lookaside buffer purging process is active. This is because an invalidation of virtual addresses does not necessarily mean that the data stored at said virtual addresses is also invalid. Therefore, it is desired that data is written into the data fields of the cache lines no matter whether the corresponding virtual addresses have meanwhile become invalid or not.

Additionally, the method causes the translation lookaside buffer purge process to be restored to an earlier state whenever the translation lookaside buffer purge process and the cache update process each perform a write operation to the primary cache memory simultaneously. Write operations of the cache update process may take precedence over write operations of the translation lookaside buffer purge process. This means a write operation of the translation lookaside buffer purge process cannot be performed correctly if a write operation by the cache update process is performed at the same time. According to the present invention, the translation lookaside buffer purge process is therefore restored to a previous state if such a collision occurs. At least one operation of the translation lookaside buffer purge process is then executed again so that any errors which may have been caused by the conflict of the write operations can be rectified.

The cache update process may store responses from another cache memory into the primary cache memory. However, according to other embodiments, the data which is stored into the primary cache memory must not necessarily stem from a response by another cache memory, but may also have any other source. Therefore, the present invention is suitable for performing a translation lookaside buffer purge while any type of cache update process is active concurrently.

According to an embodiment of the invention, the primary cache memory may be a level one cache. The primary cache memory may be a direct-mapped cache, a two way associative cache, a fully associative cache, or it may have any other type of associativity. The virtual address field may be a field dedicated to storing a virtual address or a tag derived from a virtual address. This means that the virtual address field may store only part of a virtual address. In addition to the virtual address field and the data field, each cache line may contain any number of additional fields. For instance, the data field may include one or more flag fields.

Each cache line may also include a field for storing an error correction code. It is advantageous if the above-mentioned method is performed by computer processor with a cache hierarchy which includes a level one cache as its primary cache, a level two cache, and a level three cache. The cache update process may be any process which overwrites at least one cache line of the primary cache memory. Write operations of the cache update process may be triggered when information from a system memory, for instance from a cache memory other than the primary cache memory, have been successfully retrieved. However, operations of the cache update process may also be triggered in any other manner.

According to an embodiment of the invention, the translation lookaside buffer purge process may be started by a memory management unit. According to another embodiment of the invention, the translation lookaside buffer purge process may be triggered by an update of information contained within a page table. According to an embodiment of the invention, the translation lookaside buffer purge process may be started at any time regardless of whether a cache update process is currently active and regardless of whether any requests for data from any cache memory are currently active. According to some embodiments of the invention, the translation lookaside buffer purge process may purge an entry in a cache line by overwriting the virtual address field in said cache line with a certain value. For example, the virtual address field may be overwritten by zeroes. According to another embodiment of the invention, the invalidation may be achieved by setting a designated field in a cache line to a certain value.

According to some embodiments of the present invention, the translation lookaside buffer purge process includes reading data from a cache line, evaluating whether said cache line has to be invalidated and invalidating said cache line if necessary. In a first step, data is read from the cache line. Said data may include data from the virtual address field and/or data from the data field in the cache line. It is then determined whether said cache line has to be invalidated. For instance, it may be evaluated whether the virtual address field contains a virtual memory address or part of a virtual memory address which is no longer valid. In this case, the cache line has to be invalidated. If the evaluation has determined that an invalidation of the contents of the cache line is necessary, data may be written to the cache line in order to perform the invalidation. The steps of reading data from the primary cache memory and writing data to the primary cache memory may be performed during different clock cycles. Between the steps of reading data from a cache line of the primary memory and writing data to said cache line, there may lie one or multiple clock cycles. According to some embodiments of the invention, the translation lookaside buffer purge process may iterate over all or over at least some of the cache lines in the primary cache memory. According to another embodiment of the invention, the translation lookaside buffer purge process may selectively seek out certain cache lines and invalidate them if necessary. It is also possible that the operations of the translation lookaside buffer purge process follow any other pattern in order to read, evaluate, and invalidate cache lines in the primary cache memory.

A method according to the present invention may be executed such that the translation lookaside buffer purge process is pipelined and simultaneously reads data from and writes data to different cache lines. This embodiment has the advantage that it allows for an overall faster execution of the translation lookaside buffer purge process. For instance, a pipelined process may simultaneously read data from a first cache line in the primary memory, evaluate data which has already been read from a second cache line in the primary memory, and write data to a third cache line in the primary memory if required, invalidating the entry in said third cache line. According to this embodiment of the invention, the translation lookaside buffer purge process iterates a read-evaluate-write window over the whole or over parts of the primary cache memory. A read pointer may point to a location in the primary memory which is currently being read from. A write pointer may point to a cache line which is currently being written to. After a clock cycle has completed, the read pointer and the write pointer may be incremented. According to some embodiments of the invention, the read-evaluate-write window has a size of two cache lines, wherein a first cache line is being read and a second cache line is being written to. According to another embodiment of the invention, the read-evaluate-write window has a size of three cache lines, wherein a first cache line is being read to, a second cache line has been read from in a previous clock cycle and will be written to in subsequent clock cycle, and a third cache line is currently being written to. According to other embodiments of the invention, the write window may have a size larger than three cache lines, wherein multiple cache lines within the window have already been read and are scheduled to be invalidated by the translation lookaside buffer purge process.

According to an embodiment of the invention, the translation lookaside buffer purge process is restored to the earlier state by setting a value of a read pointer of the translation lookaside buffer purge process to a value of the write pointer of the translation lookaside buffer purge process. Whenever a cache update process writes data to the primary cache memory, this may interfere with the translation lookaside buffer purge process. This is because write operations by the cache update process take precedence over write operations by the translation lookaside buffer purge process.

In order to avoid this problem, a read pointer of the translation lookaside buffer purge process may be reset to point to the cache line which the write pointer of the translation lookaside buffer was previously set to. This effectively causes a rollback of the translation lookaside buffer purge operation to a previous state. However, the translation lookaside buffer purge process is not started completely anew, i.e., this has the advantage that the translation lookaside buffer purge process does not have to be applied to the complete primary cache memory again. Instead, only a few relevant cache lines are reevaluated. This method is particularly suitable if it is applied in conjunction with a pipelined translation lookaside buffer purge process as described above.

According to another embodiment of the invention, outstanding write operations of the cache update process are stored as entries in a response table. At least one entry in the response table is marked when the translation lookaside buffer purge process is started, and the cache update process does not overwrite the virtual address field of a cache line if the entry of the corresponding write operation has been marked. This embodiment allows for an easy way to track whether write operations by the cache update process are executed at the same time as write operations by the translation lookaside buffer purge process. The response table may store information regarding write operations which are outstanding because data corresponding to said entries have not yet been read from another computer memory. For instance, the response table may contain read requests to another cache memory of the computer processor. According to an embodiment of the invention, the other cache memory of the computer processor may be a level two cache or a level three cache. Once the other computer memory has been accessed and data has been successfully retrieved from the other computer memory, said data can be stored into the primary cache memory by the cache update process. When the translation lookaside buffer purge process is running, it is important that the virtual address fields in the primary cache memory are not overwritten. Therefore, at least one entry in the response table is marked. According to an embodiment of the invention, each entry in the response table features a purge field. This purge field may be set in order to mark an entry. During the cache update process, it may then be checked whether the purge field of an entry in the response table has been set, and if this is the case, the virtual address field in the corresponding cache line of the primary memory is not overwritten by the cache update process.

According to an embodiment of the invention, all entries in the response table are marked when the translation lookaside buffer purge process is started. According to another embodiment of the invention, entries in the translation lookaside buffer purge process are marked selectively. Selective marking may be achieved according to criteria retrieved from the translation lookaside buffer and/or a page table and/or a memory management unit. According to some embodiments of the invention, no new entries may be added to the response table while a translation lookaside buffer purge process is active. According to an embodiment of the invention, this means that no further data may be scheduled to be read from the other computer memory, which may be a level two cache or a level three cache. In this case, only the requests which are currently stored in the response table will be processed during the translation lookaside buffer purge process. According to another embodiment of the invention, it is also possible that further entries are added to the response table while the translation lookaside buffer purge process is still running. These subsequently added entries may then be marked immediately after they have been added to the response table.

According to another embodiment of the invention, the cache update process may include updating a secondary cache memory, and whenever each the translation lookaside buffer purge process and the cache update process perform a write operation to the primary cache memory simultaneously, the cache update process overwrites a data field in a cache line of the secondary cache memory, but does not overwrite an address field in said cache line. This has the advantage that the secondary cache memory can be updated according to the same principles as the primary cache memory. According to an embodiment of the invention, said secondary cache memory is a level two cache. Each cache line of said level two cache may contain at least an address field and a data field. The address field may store a physical address or part of a physical address. According to this embodiment of the invention, the address field of the secondary cache memory shall not be overwritten by the cache update process if the physical address is possibly invalid. In order to determine whether the address field of a cache line should be overwritten, the method may involve checking whether a corresponding entry in the response table has been marked. According to some embodiments of the invention, this check may involve determining whether a purge field of that entry in the response table has been set.

According to another embodiment of the invention, the cache update process retrieves data which is to be written to the primary cache memory from a tertiary cache memory. The tertiary cache memory may be a level three cache. The cache update process may also retrieve data which is to be written to the primary cache memory from any other source. Data may be retrieved from the tertiary cache memory and then be provided to the cache update process as well as further data sinks. Such a further data sink may be a CPU core which has initially requested the data from the tertiary cache memory. The tertiary cache memory may be accessed by using a response table as described above.

According to another embodiment of the invention, a purge unit handles the translation lookaside buffer purge process and notifies an arbitration unit if the translation lookaside buffer purge process is active. The arbitration unit may be responsible for coordinating access to the primary cache memory. The purge unit is not necessarily restricted to one area of a computer processor. Its functionality may also be distributed over various parts of the device or implemented by different components. The same applies to the arbitration unit. According to an embodiment of the invention, while the purge unit notifies the arbitration unit, the arbitration unit shall prevent data from being written to virtual address fields in the primary and/or the secondary cache memory. Alternatively or additionally, the arbitration unit may notify the purge unit if an access conflict to the primary cache memory has occurred between the translation lookaside buffer purge process and the cache update process. For instance, the purge unit may be connected to the arbitration unit via a signal line REQ. According to this example, the value '1' is emitted to signal line REQ by the purge unit if a translation lookaside buffer purge process is active and the purge unit shall emit the value '0' if no translation lookaside buffer purge process is currently active. The purge unit may also be connected to the arbitration unit over a signal line GNT. According to an embodiment of the invention, the arbitration unit shall always set signal line GNT to a value of '1' as long as the purge unit signals that the translation lookaside buffer purge process is active, except when there is a conflict between the translation lookaside buffer purge process and a cache update process. In case of such a conflict, the arbitration unit shall set signal line GNT to a value of '0'. This indicates to the purge unit that the translation lookaside buffer purge process has to be restored to a previous state.

According to another embodiment of the invention, a purge unit handles the translation lookaside buffer purge process and marks at least one entry in a response table that stores outstanding write operations of the cache update process, and the cache update process does not overwrite the virtual address field of a cache line if the entry of the corresponding write operation has been marked. The purge unit may mark the at least one entry in the response table when the translation lookaside buffer purge process is started. According to other embodiments of the invention, the purge unit may also mark the entries in the response table at a later time during the translation lookaside buffer purge process. The response table may be a response table as has been described above. According to some embodiments of the invention, the purge unit is connected to the response table and is responsible for setting purge fields in the response table. According to an embodiment of the invention, the purge unit may be configured such that it indiscriminately sets the purge fields of all entries in the response table when the translation lookaside buffer purge process is started. According to another embodiment of the invention, the purge unit may set purge field of entries in the response table selectively. For this purpose, entries in the response table may first be read, their content may be evaluated and the purge fields may then be set according to the result of the evaluation. Setting a field may involve changing the value of this field to a certain value.

The present invention also relates to a computer processor with a translation lookaside buffer and a primary cache memory with multiple cache lines. Each cache line contains a virtual address field and a data field, and the computer processor contains a purge unit which is configured to perform a translation lookaside buffer purge process. The purge unit is configured to perform operations for invalidating data in the primary cache memory which do not conform to the current state of the translation lookaside buffer. Additionally, the computer processor contains an update unit for performing a cache update process. The computer processor is configured such that, whenever the translation lookaside buffer purge process and the cache update process each perform a write operation to the primary cache memory simultaneously, the write operation by the translation lookaside buffer purge process has no effect on the content of the primary cache memory. An arbitration unit in the computer processor is configured such that, whenever the translation lookaside buffer purge process and the cache update process each perform a write operation to the primary cache memory simultaneously, it is ensured that the cache update process overwrites a data field in a cache line of the primary cache memory but does not overwrite a virtual address field of said cache line. The purge unit is configured to restore the translation lookaside buffer purge process to an earlier state and to restart the translation lookaside buffer purge process if the translation lookaside buffer purge process and the cache update process each perform a write operation to the primary cache memory simultaneously. According to an embodiment of the invention, the primary cache memory has only one write port and the computer processor contains logic which is configured such that write operations by the cache update process take precedence over write operations by the translation lookaside buffer purge process. The computer processor according to the present invention has the advantage that a translation lookaside buffer purge process and a cache update process can be run simultaneously. It is therefore not necessarily to wait for the cache update process to complete before the translation lookaside buffer purge process is started.

According to an embodiment of the invention, the purge unit of the computer processor is configured to read data from a cache line in the primary cache memory, to evaluate whether said cache line has to be invalidated and to invalidate said cache line if necessary. The purge unit may be connected to the primary cache memory via a data bus or via a direct data connection. The purge unit may be configured such that it can receive an external command which triggers a translation lookaside buffer purge. In order to be able to determine which entries in a translation lookaside buffer of the computer processor have to be purged, the purge unit may have read and/or write access to said translation lookaside buffer.

According to another embodiment of the invention, the purge unit may be configured to simultaneously read data from and write data to different cache lines in a pipelined manner. The purge unit may write data to the primary cache memory in order to invalidate a cache line in the primary cache memory. In some embodiments of the present invention, the purge unit is configured such that it iterates over cache lines in the primary cache memory, reading and subsequently invalidating each cache line if required. During the translation lookaside buffer purge process, a read data pointer may point to a cache line in the primary cache memory which is currently being read by the purge unit, and a write data pointer may point to a cache line in the primary cache memory which is currently being invalidated by the purge unit. According to some embodiments of the invention, the purge unit restores the translation lookaside buffer purge process by setting a value of a read pointer of the translation lookaside buffer purge process to a value of a write pointer of the translation lookaside buffer purge process.

According to some embodiments of the invention, outstanding write operations of the cache update process are stored as entries in a response table, and the computer system is configured such that at least one entry is marked when the translation lookaside buffer purge process is started, and the computer system is configured such that the cache update process does not overwrite the virtual address field of a cache line if the entry of the corresponding write operation has been marked. In some embodiments of the present invention, all entries in the response table are marked when the translation lookaside buffer purge process is started. The cache update process may transfer data which has been recently read from another computer memory to the primary cache memory. Said other computer memory is preferably a cache memory. In particular, said other computer memory may be a level two cache or a level three cache. When the content of a memory location in the other computer memory has been retrieved, the update unit writes the content to the primary cache memory.

According to another embodiment of the invention, the update unit is configured such that the update process includes updating a secondary cache memory, and the update unit and the arbitration unit are configured such that whenever the translation lookaside buffer purge process and the cache update process each perform a write operation to the primary cache memory simultaneously, the cache update process overwrites a data field in a cache line of the secondary cache memory but does not overwrite an address field of said cache line. The secondary cache memory may be a level two cache. According to some embodiments of the invention, the update unit may check whether the corresponding entry in the response table has been marked. If the corresponding entry has been marked, then the update unit only overwrites a data field in a cache line of the primary cache memory. In this case, the update unit does not overwrite a virtual address field of said cache line.

According to another embodiment of the invention, the update unit is configured such that the cache update process retrieves data which is to be written to the primary cache memory from a tertiary cache memory. The tertiary cache memory may be a level three cache. The update unit may be connected to the tertiary cache memory over a data bus. According to some embodiments of the invention, the computer processor may have a level one cache, a level two cache, and a level three cache. All these caches may be connected to one system cache bus. In addition, the translation lookaside buffer of the computer processor may be connected to said bus. The computer processor may be a simultaneous multithreading system with at least two cores, all of which are connected to the same cache hierarchy featuring a level one cache, a level two cache and a level three cache.

According to an embodiment of the invention, the purge unit is configured to notify the arbitration unit if the translation lookaside buffer purge process is active. According to this embodiment, the purge unit may be connected to the arbitration unit over a signal line. Once the purge process is started, the purge unit may change its output to the signal line. This indicates to the arbitration unit that the translation lookaside buffer purge process is currently underway. When the translation lookaside buffer purge process has finished, the purge unit changes its output to the signal line, which indicates to the arbitration unit that the translation lookaside buffer purge process has been stopped. The information that the translation lookaside buffer purge process has been stopped may be communicated to the arbitration unit over a dedicated signal line or over a system bus which connects the purge unit and the arbitration unit.

According to an embodiment of the invention, the arbitration unit is configured to notify the purge unit if there has been a conflict between the translation lookaside buffer purge process and the cache update process. According to an embodiment of the invention, the conflict occurs whenever both the translation lookaside buffer purge process and the cache update process simultaneously request to write data into the primary cache memory. A corresponding notification may be transmitted over a dedicated signal line or over a system bus. According to an embodiment of the invention, the arbitration unit may control whether the cache update process can overwrite virtual address fields of the primary cache memory.

According to another embodiment of the invention, the purge unit is configured to mark at least one entry in a response table which stores outstanding write operations of the cache update process, and an arbitration unit is configured to ensure that the virtual address field of a cache line is not overwritten if the entry of the corresponding write operation has been marked. For instance, the purge unit may mark all entries in the response table. According to another embodiment of the invention, the response table may mark entries in response table selectively according to the state of the translation lookaside buffer, according to the state of a page table of the computer processor or according to any other criterion. Each line in the response table may contain a dedicated purge field which is intended for marking said line. Such a purge field may be set in order to mark an entry in a line of the response table. When data which corresponds to the entry in said line is supposed to be written to the primary cache memory, the arbitration unit may then refer to the response table in order to determine if the purge field has been set. If this is the case, the arbitration unit will not overwrite the virtual address field in the cache line.

Figure 1:
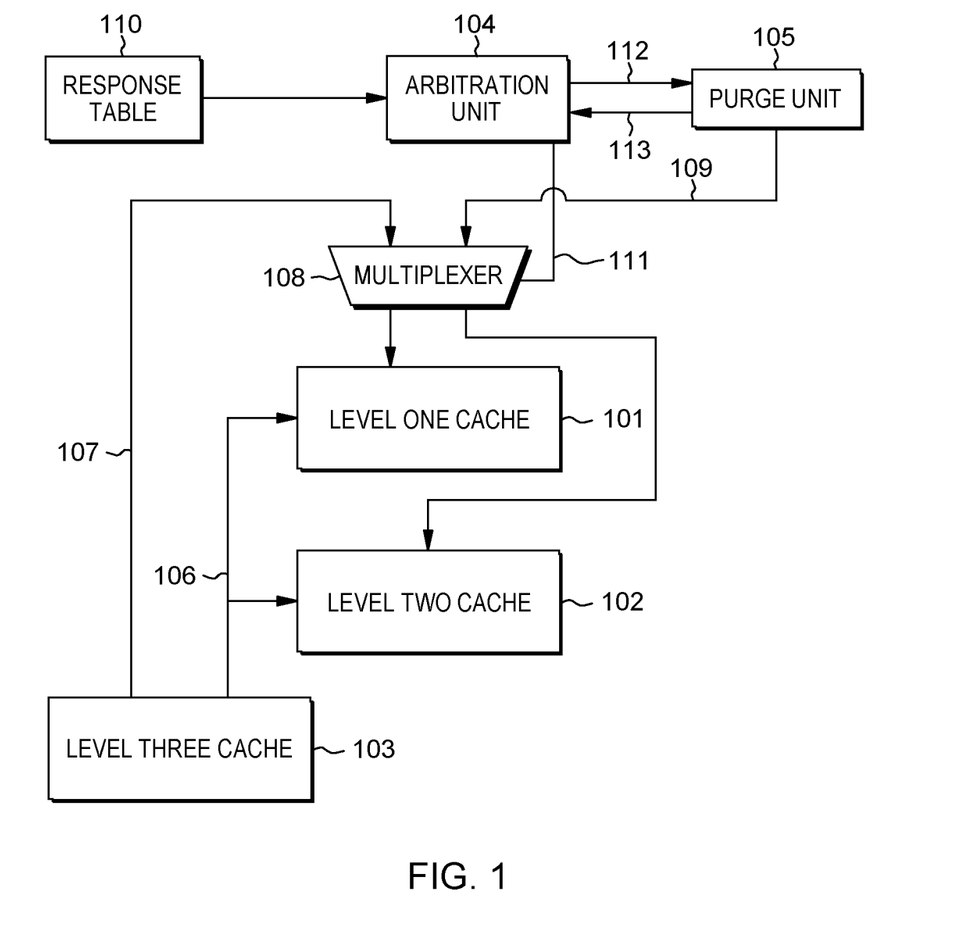
FIG. 1 shows a data flow diagram of a computer processor according to the present invention.

Referring now to the drawings, FIG. 1 shows a data flow diagram of a computer processor according to the present invention. The computer processor has a level one cache 101, a level two cache 102, and a level three cache 103. It also features an arbitration unit 104 and a purge unit 105. A data pathway 106 leads from the level three cache 103 to the level one cache 101 and the level two cache 102. The data pathway 106 transmits data to the level one cache 101 and to the level two cache 102. Said data is thereby written into data fields within cache lines of the level two cache 102 and of the level three cache 103. Said data is written into the data fields of the level two cache 102 and the level three cache 103 no matter whether a translation lookaside buffer purge process is currently active. This ensures that data which has been recently read from the level three cache 103 is also made available to the level one cache 101 and the level two cache 102.

Apart from the data pathway 106, there is also an address pathway 107 which transmits address data from the level three cache 103 to a multiplexer 108, which is not an actual unit in the system but merely serves to illustrate how dataflow in the system is controlled. Those skilled in the relevant arts will readily appreciate how to implement the functionality of multiplexer 108 in hardware. There is also a purge pathway 109 which leads from the purge unit 105 to the multiplexer 108. The purge unit 105 may perform a translation lookaside buffer purge process, invalidating cache lines in the level one cache 101 over the purge pathway 109. The arbitration unit 104 retrieves information from a response table 110. The response table 110 contains information with regard to data which is being transmitted from the level three cache 103 over the data pathway 106 and the address pathway 107. If the address data which is currently being transmitted to the multiplexer 108 corresponds to an entry in the response table 110 which has been marked, then the address data is not stored into cache lines of the level one cache 101 and of the level two cache 102. If the address data which is currently being transmitted to the multiplexer 108 corresponds to an entry in the response table 110 which has not been marked, then the address data is stored into the level one cache 101 and into the level two cache 102. The arbitration unit 104 controls the multiplexer 108 over a control pathway 111.

It should be noted that while a virtual address or part of a virtual address can be stored into an address field of a cache line of the level one cache 101, only physical addresses are stored in address fields of the level two cache 102. For this purpose, a virtual address may first have to be converted into a physical address, or vice versa. If the purge unit is currently conducting a translation lookaside buffer purge process, then the purge unit may invalidate data over the purge pathway 109. It is also possible that an invalidation operation takes place at the same time as a cache update operation of a cache update process. In this case, the cache update operation takes precedence and the invalidation operation cannot be carried out.

The arbitration unit 104 and the purge unit 105 are connected by a GNT pathway 112 and a REQ pathway 113. The REQ pathway serves to indicate to the arbitration unit that a translation lookaside buffer purge process is currently underway. The GNT pathway serves to indicate to the purge unit that a collision has occurred between an invalidation operation and a purge operation. Both pathways may be implemented as signal lines.

Figure 2:
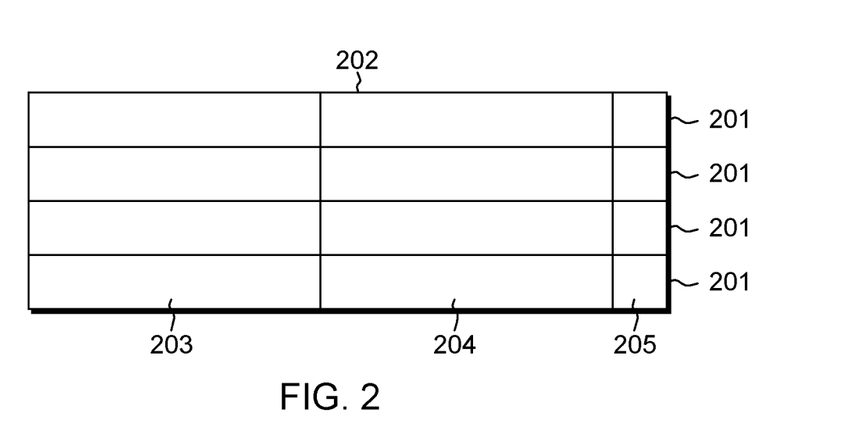
FIG. 2 illustrates the structure of cache lines in a level one cache of a computer processor according to an embodiment of the invention.

FIG. 2 illustrates the structure of the cache lines 201 in a level one cache 202 of a computer processor according to an embodiment of the invention. Four cache lines 201 out of a larger number of cache lines in a level one cache 202 are shown. The level one cache 202 is suitable for storing data which can be quickly accessed by a CPU core. In each cache line 201, the level one cache 202 features a virtual address field 203, a data field 204, and a valid field 205. The virtual address field 203 in each line is supposed to store a virtual address or part of a virtual address as a tag. The data field 204 is intended to store data for quick access. When the data from the data field is supposed to be accessed, a virtual address or part of a virtual address is transmitted to the cache 202 and compared to the content in each or at least some of the virtual address fields 203. This allows to determine whether the level one cache 202 contains the desired data and to retrieve said data. The valid field 205 indicates whether the data in a certain cache line 201 is still valid, or whether the corresponding virtual address has already been invalidated. According to other embodiments of the invention, each cache line 201 may also include further fields. For instance, each cache line 201 may also contain a field for holding an error correction code or a purge information field which stores information that is relevant to a translation lookaside buffer purge process.

Figure 3:
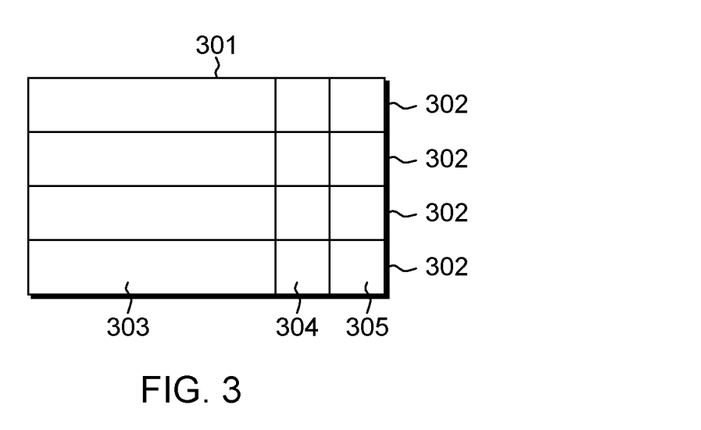
FIG. 3 illustrates the structure of a response table according to an embodiment of the invention.

FIG. 3 illustrates the structure of a response table 301 according to an embodiment of the invention. The response table 301 stores pending requests to a level three cache. It contains multiple cache lines 302. Each cache line 302 features an identification field 303. The identification field 303 contains information which allows identifying responses from a level three cache. Each line of the response table 301 also has a purge field 304 which allows marking entries in the response table 301. The entries may be marked in order to signify that a translation lookaside buffer purge process has been started while these entries were in the response table 301. In addition, each line of the response table 301 includes a valid field 305. The valid field 305 can be used to indicate that an entry in the response table 301 has not yet been successfully written to a level one cache of the computer processor. According to other embodiments of the invention, each line 302 of the response table 301 may also feature additional fields.

Figure 4:
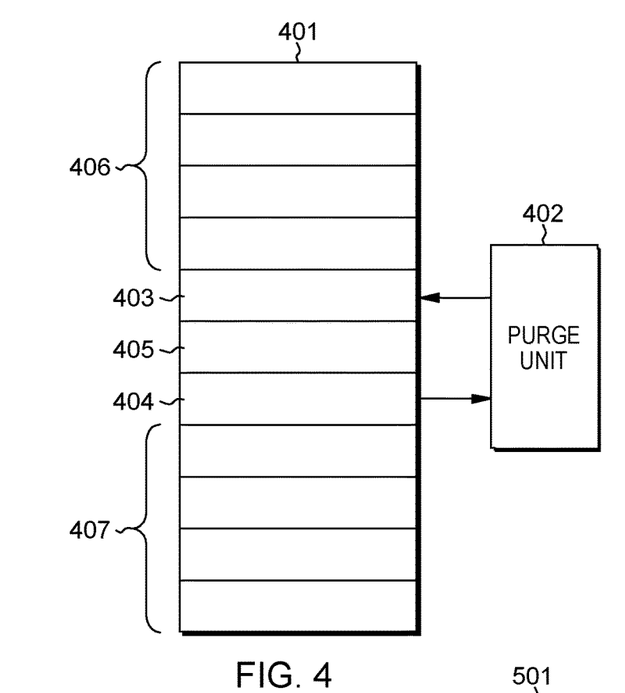
FIG. 4 illustrates how a translation lookaside buffer purge process may be performed according to an embodiment of the invention.

FIG. 4 illustrates how the translation lookaside buffer purge process may be performed according to an embodiment of the invention. A level one cache 401 contains multiple cache lines. A purge unit 402 iterates over all cache lines in order to invalidate the content of the cache lines. The invalidation of each cache line comprises three steps. In a first step, the contents of the cache line are read. In a second step, it is evaluated whether the contents of the cache line have to be invalidated. The contents of the cache line are invalidated in a third step, if necessary. According to the embodiment as illustrated, this is performed by a pipelined process. This means that data is read from and written to the level one cache simultaneously. The purge unit 402 iterates through the level one cache from top to bottom. It has a read pointer and write pointer. The read pointer currently points to cache line 404, while the write pointer currently points to cache line 403. Therefore, the purge unit reads data from cache line 404 and writes data to cache line 403. Cache line 403 has been read two cycles previously, whereupon it has been determined that this cache line has to be invalidated. Cache line 405 has been read one cycle previously. During the current cycle, it is being evaluated whether cache line 405 has to be invalidated. During the subsequent cycle, the write pointer will be iterated so that it points to cache line 405. Therefore, cache line 405 may be invalidated during the subsequent cycle.

All cache lines in section 406 of the level one cache have already been subject to the translation lookaside buffer purge process. All cache lines in section 407 will be processed subsequently. Cache lines 403, 404 and 405 are currently subject to the translation lookaside buffer purge process. If an update operation of the cache update process writes to any of the cache lines, then the update operation will take priority over the purge operation. The operations on cache lines 403, 404, and 405 will therefore fail. This means that the purge operation will have to be restored subsequently to an earlier state in order to ensure that it is performed correctly. If the cache update process writes data from a level three cache to any of the cache lines in section 407, this is not problematic because these fields will be handled by the purge process subsequently. It is also of no concern if the cache update process writes data to the cache lines in section 406 because, according to the present invention, the virtual address data will not be updated in the level one cache while the purge process is under way.

Figure 5:
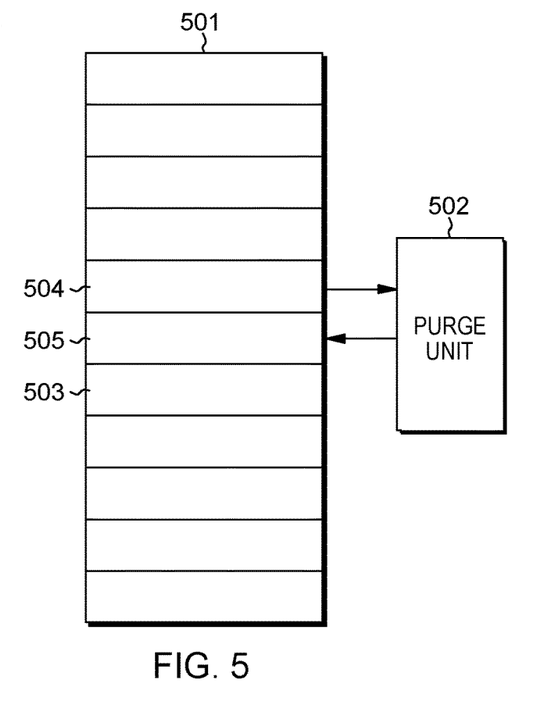
FIG. 5 illustrates how conflicts between a translation lookaside buffer purge process and a cache update process can be resolved according to an embodiment of the invention.

FIG. 5 illustrates how conflicts between a translation lookaside buffer purge process and a cache update process can be resolved according to an embodiment of the invention. A level one cache 501 containing multiple cache lines has been subject to a translation lookaside buffer purge process by a purge unit 502. In a previous clock cycle, a read pointer of the purge unit 502 pointed to cache line 503, and a write pointer pointed to cache line 504. The write pointer has now been iterated and therefore points to cache line 505. During the previous cycle, a write operation by the translation lookaside buffer purge process was supposed to be performed on cache line 504. However, at the same time, a write operation by the cache update process was also performed on cache line 504. Therefore, a write conflict occurred between write operations of the translation lookaside buffer purge process and the cache update process. Operations by the cache update process take precedence over operations by the translation lookaside buffer purge process. Therefore, it was not possible to properly invalidate cache line 504.

In order to ensure that cache line 504 is invalidated correctly, the read pointer of the purge unit is reset to the location of the cache line which was last written to by the translation lookaside buffer purge process, that is, cache line 504. This means that cache line 504 can now be read again and it can be determined whether its contents, which have been updated during the previous cycle, will have to be invalidated. This means that the translation lookaside buffer purge process is rolled back.

It is an advantage of this method that no full roll-back of the translation lookaside buffer purge process has to be performed. Only few of the operations of the translation lookaside buffer purge process have to be performed again if a conflict occurs.

Figure 6:
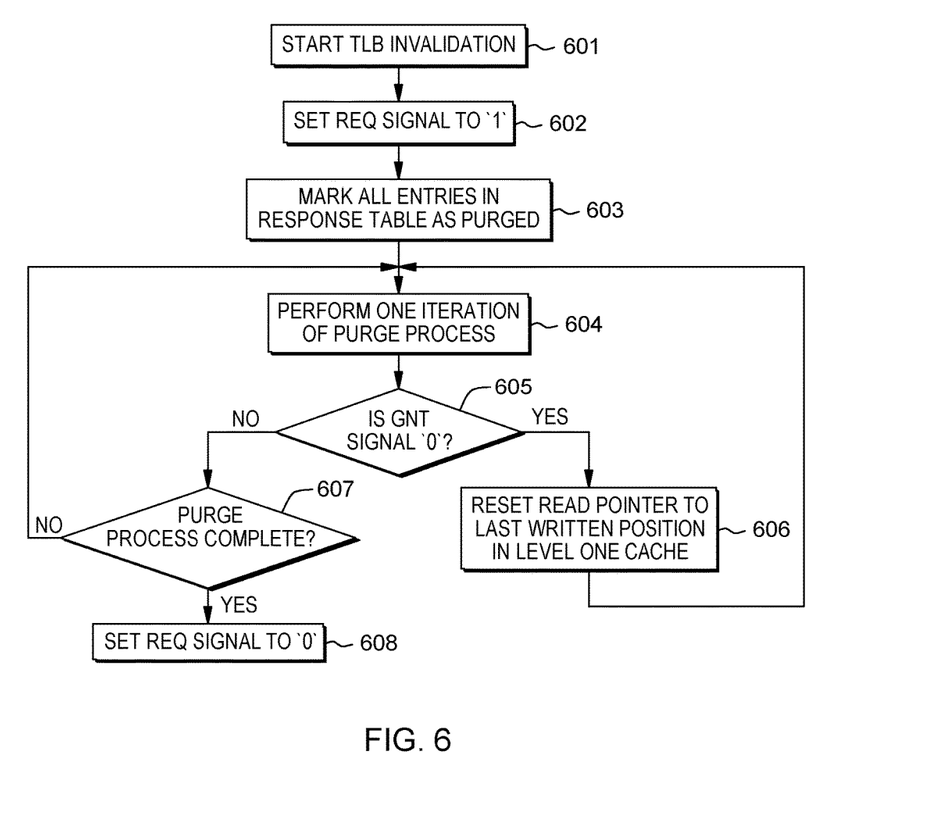
FIG. 6 is a flowchart showing a method for performing a translation lookaside buffer purge with concurrent cache updates according to an embodiment of the invention.

The flowchart of FIG. 6 shows a method for performing a translation lookaside buffer purge with concurrent cache updates according to an embodiment of the invention. In a start step 601, a translation lookaside buffer purge process is started. The translation lookaside buffer purge process is started by an external entity and may be triggered when virtual addresses become invalid and therefore also need to be invalidated in a level one cache. A purge unit is responsible for performing the translation lookaside buffer purge process. In a first notification step 602, the purge unit sets a REQ signal to the value of '1' in order to indicate that the translation lookaside buffer purge process is active. In a marking step 603, the purge unit then marks all entries in the response table as purged. This may be achieved by setting a purge field in all entries in the response table. In a purge operation step 604, one step of a pipelined purge process is executed. This means that data is read from a cache line in the level one cache and that another cache line in the level one cache is invalidated if necessary. In a decision step 605, the purge unit checks whether a GNT signal has a value of '0'. The GNT signal is generated by an arbitration unit. The GNT signal is set to '0' whenever there is a conflict between the cache update process and the translation lookaside buffer purge process. If this is the case, then a value of a read pointer of the purge unit is assigned a value of a write pointer of the purge unit in a rollback step 606. The method is then resumed at the purge operation step 604.

If there is no write conflict, then a completion evaluation step 607 is performed. It is checked whether the purge unit has fully iterated through the level one cache. If this is the case, the method reaches the second notification step 608, wherein the REQ signal is set to '0'. This notifies the arbitration unit of the fact that the translation lookaside buffer purge process is no longer active.

Figure 7:
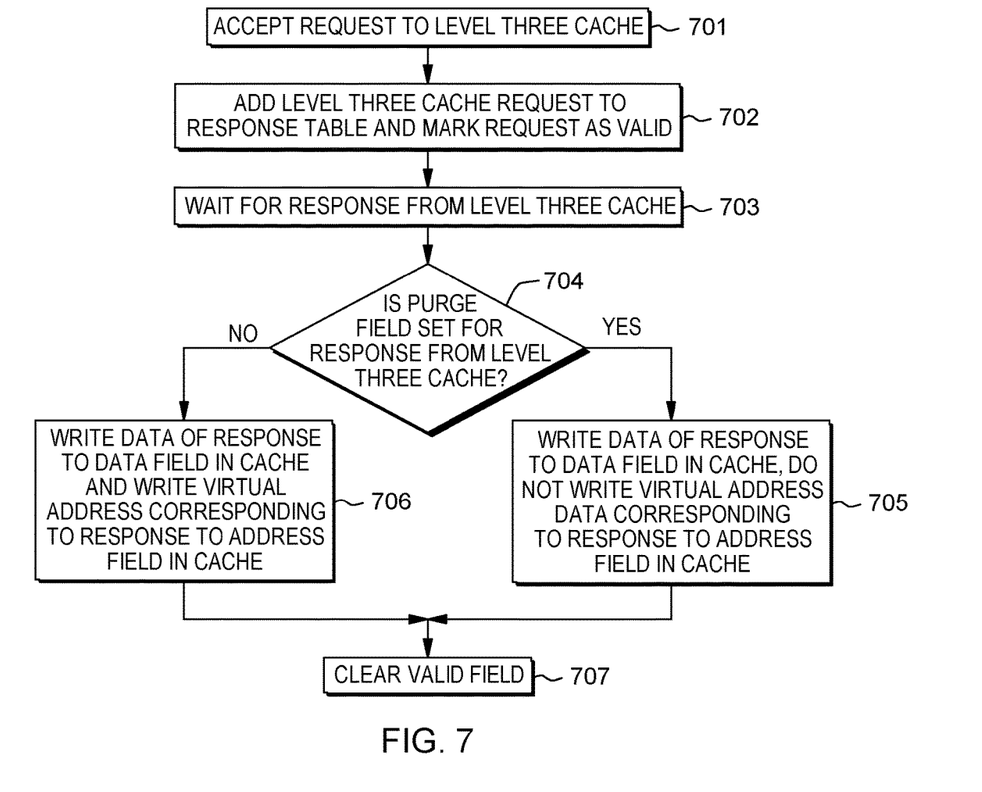
FIG. 7 is a flowchart showing a method for performing a translation lookaside buffer purge with concurrent cache updates according an embodiment of the invention.

The flowchart of FIG. 7 shows a method for performing a translation lookaside buffer purge with concurrent cache updates according an embodiment of the invention. The tasks from the flowchart in FIG. 7 may be performed concurrently to the tasks as shown in the flowchart according to FIG. 6. In an initial step 701, a request to retrieve data from a level three cache is accepted. The request may be triggered externally, for example by a processor core which requests data. In an entry step 702, the request is entered into a response table. The response table can be used to track the current state of the request. In a wait step 703, an update unit waits for a response from the level three cache. The update unit is responsible for writing data which has been successfully retrieved from the level three cache to the level one cache and also to a level two cache. In a purge evaluation step 704, a response has been received from the level three cache. It is then evaluated whether a purge field of the corresponding entry in the response table has been set. If the purge field has been set, then the update unit writes data from the level three response to a data field in the level one cache in update step 705. However, the content of a virtual address field in the same address line is left as-is.

This ensures that virtual address fields are not updated in the level one cache while a translation lookaside buffer purge process is active. This is particularly relevant in so far as it prevents potentially invalid address data from being written to the level one cache. For instance, if invalid virtual address data is written to a section of the level one cache which has already been handled by the translation lookaside buffer purge process, for example into section 406 as shown in FIG. 4, then invalid virtual address data would remain in the level one cache after completion of the translation lookaside buffer purge process. If the purge field is not set, then both data and virtual address may safely be written to the level one cache, see update step 706. After either the update step 705 or the update step 706 has been completed, the update unit performs a clearing step 707 in which a valid field in the response table is cleared. This indicates that data has been received in response to a request to the level three cache and a corresponding cache update in the level one cache has been completed successfully.

Figure 8:
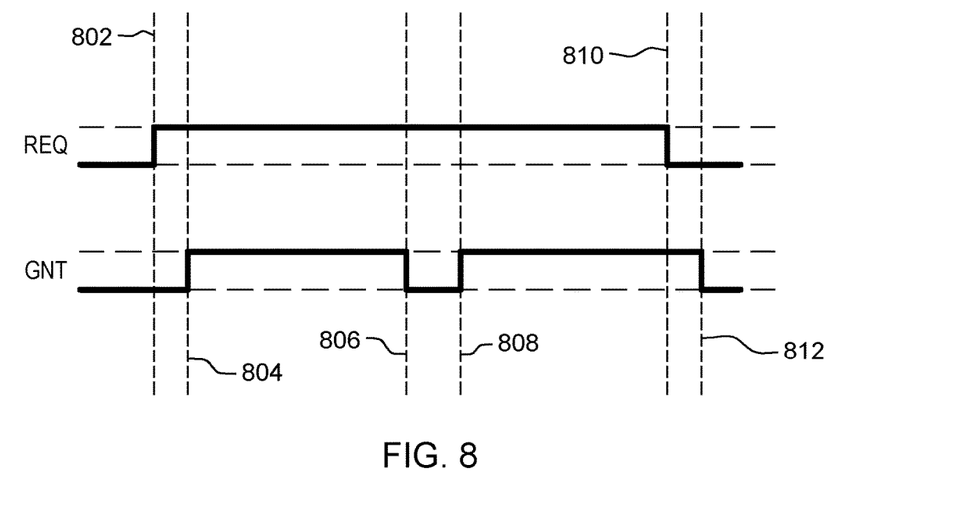
FIG. 8 shows a digital timing diagram of both the REQ and the GNT signal according to an embodiment of the invention.

FIG. 8 shows a digital timing diagram of both a REQ and a GNT signal line according to an embodiment of the invention. These signal lines connect a purge unit with an arbitration unit. Initially, both REQ and GNT have a value of '0'. The translation lookaside buffer purge process is then activated, which causes the purge unit to set REQ to '1' (802). In response, the arbitration unit sets GNT to '1' (804), indicating to the purge unit that currently, no data is being updated in the level one cache. A short time later, an update operation of the cache update process is started and there is a collision with the translation lookaside buffer purge process, and therefore the arbitration unit sets GNT to '0' (806). The purge unit can then perform a rollback to a previous state. After the cache update process has been completed, the arbitration unit sets GNT to '1' again (808). Afterwards, the translation lookaside buffer purge process finishes, and therefore the purge unit sets REQ to '0' (810). The arbitration unit responds by also setting GNT to '0' (812).

Figure 9:
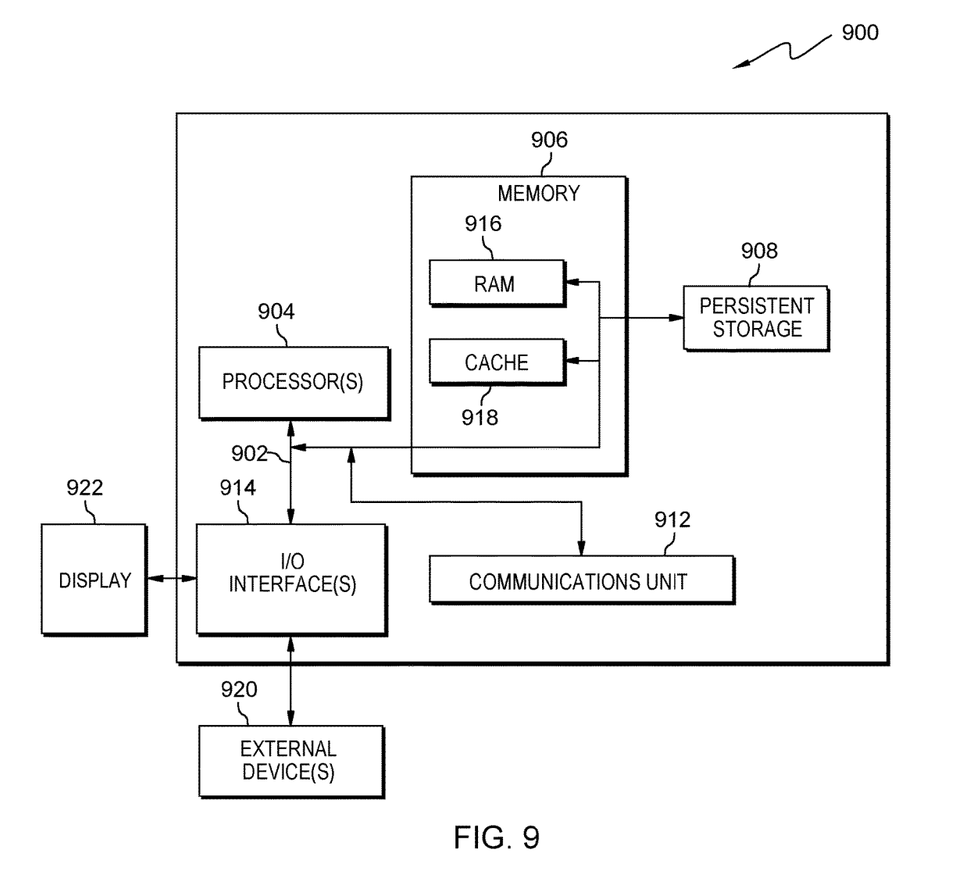
FIG. 9 is a block diagram depicting components of a computer, in accordance with at least one embodiment of the present invention.

FIG. 9 depicts a block diagram of components of computer 900 in accordance with an illustrative embodiment of the present invention. It should be appreciated that FIG. 9 provides only an illustration of one implementation and does not imply any limitations with regard to the environments in which different embodiments may be implemented. Many modifications to the depicted environment may be made.

As depicted, the computer 900 includes communications fabric 902, which provides communications between computer processor(s) 904, memory 906, persistent storage 908, communications unit 912, and input/output (I/O) interface(s) 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media.

One or more programs may be stored in persistent storage 908 for access and/or execution by one or more of the respective computer processors 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Communications unit 912, in these examples, provides for communications with other data processing systems or devices. In these examples, communications unit 912 includes one or more network interface cards. Communications unit 912 may provide communications through the use of either or both physical and wireless communications links.

I/O interface(s) 914 allows for input and output of data with other devices that may be connected to computer 900. For example, I/O interface 914 may provide a connection to external devices 920 such as a keyboard, keypad, a touch screen, and/or some other suitable input device. External devices 920 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 908 via I/O interface(s) 914. I/O interface(s) 914 also connect to a display 922.

Display 922 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to optimal explain the principles of the embodiment, the practical application or technical improvement over technologies found in the marketplace, or to enable others of ordinary skill in the art to understand the embodiments disclosed herein.

What is claimed is:

1. A method for purging a translation lookaside buffer concurrently with cache updates in a computer system with a translation lookaside buffer and a primary cache memory having a first cache line that contains a virtual address field and a data field, the method comprising:
   initiating a translation lookaside buffer purge process;
   initiating a cache update process;
   determining that the translation lookaside buffer purge process and the cache update process each perform a write operation to the first cache line concurrently;
   in response to the determining:
      overwriting, by the cache update process, the data field of the first cache line of the primary cache memory,
      restoring the translation lookaside buffer purge process from a current state to an earlier state, and
      restarting the translation lookaside buffer process from the earlier state.

2. The method of claim 1, wherein the translation lookaside buffer purge process comprises:
   reading data from the first cache line of the primary cache memory;
   determining that data in the first cache line does not conform to the current state of the translation lookaside buffer; and
   in response to determining that data in the cache line does not conform to the current state of the translation lookaside buffer, invalidating the cache line.

3. The method of claim 1, wherein the translation lookaside buffer purge process comprises:
   reading data from the first cache line;
   writing data to a second cache line;
   wherein in reading data from the first cache line and writing data to the second cache line are conducted concurrently in a pipelined manner.

4. The method of claim 1, wherein restoring the translation lookaside buffer purge process to an earlier state comprises setting a value of a read pointer of the translation lookaside buffer purge process to a value of a write pointer of the translation lookaside buffer purge process.

5. The method of claim 1, further comprising:
   storing a plurality of outstanding write operations including a first outstanding write operation, of the cache update process, as a respectively corresponding plurality of entries including a first entry, in a response table, where the first entry corresponds to the first outstanding write operation; and
   in response to initiating the translation lookaside buffer purge process, marking the first entry in the response table;
   determining that the first entry in the response table is marked;
   in response to determining that the first entry in the response table is marked, preventing the cache update process from overwriting a virtual address field of a cache line corresponding to the first entry in the response table.

6. The method of claim 1, wherein:
   the cache update process includes updating a secondary cache memory, and
   on condition that the translation lookaside buffer purge process and the cache update process each perform a write operation to the primary cache memory concurrently, overwriting, by the cache update process, a data field in a cache line of the secondary cache memory but does not overwrite an address field of the cache line.

7. The method of claim 1, wherein the cache update process further comprises:
   retrieving data which is to be written to the primary cache memory from a tertiary cache memory.

8. The method of claim 1, further comprising:
   handling, by a purge unit, the translation lookaside buffer purge process; and
   on condition that the translation lookaside buffer purge process is active, notifying, by the purge unit, an arbitration unit, that the translation lookaside buffer purge process is active.

9. The method of claim 1, further comprising:
   handling access to the primary cache memory, by an arbitration unit;
   on condition that an access conflict to the primary cache memory has occurred between the translation lookaside buffer purge process and the cache update process, notifying a purge unit that that the access conflict has occurred.

10. The method of claim 1, further comprising:
    handling, by a purge unit, the translation lookaside buffer purge process;
    marking, by the purge unit, a first entry in a response table that stores outstanding write operations of the cache update process; and
    determining that the first entry in the response table is marked, the first entry corresponding to a first cache line;
    in response to determining that the first entry in the response table is marked, preventing the cache update process from overwriting a virtual address field of the first cache line.

* * * * *